Patented May 26, 1931

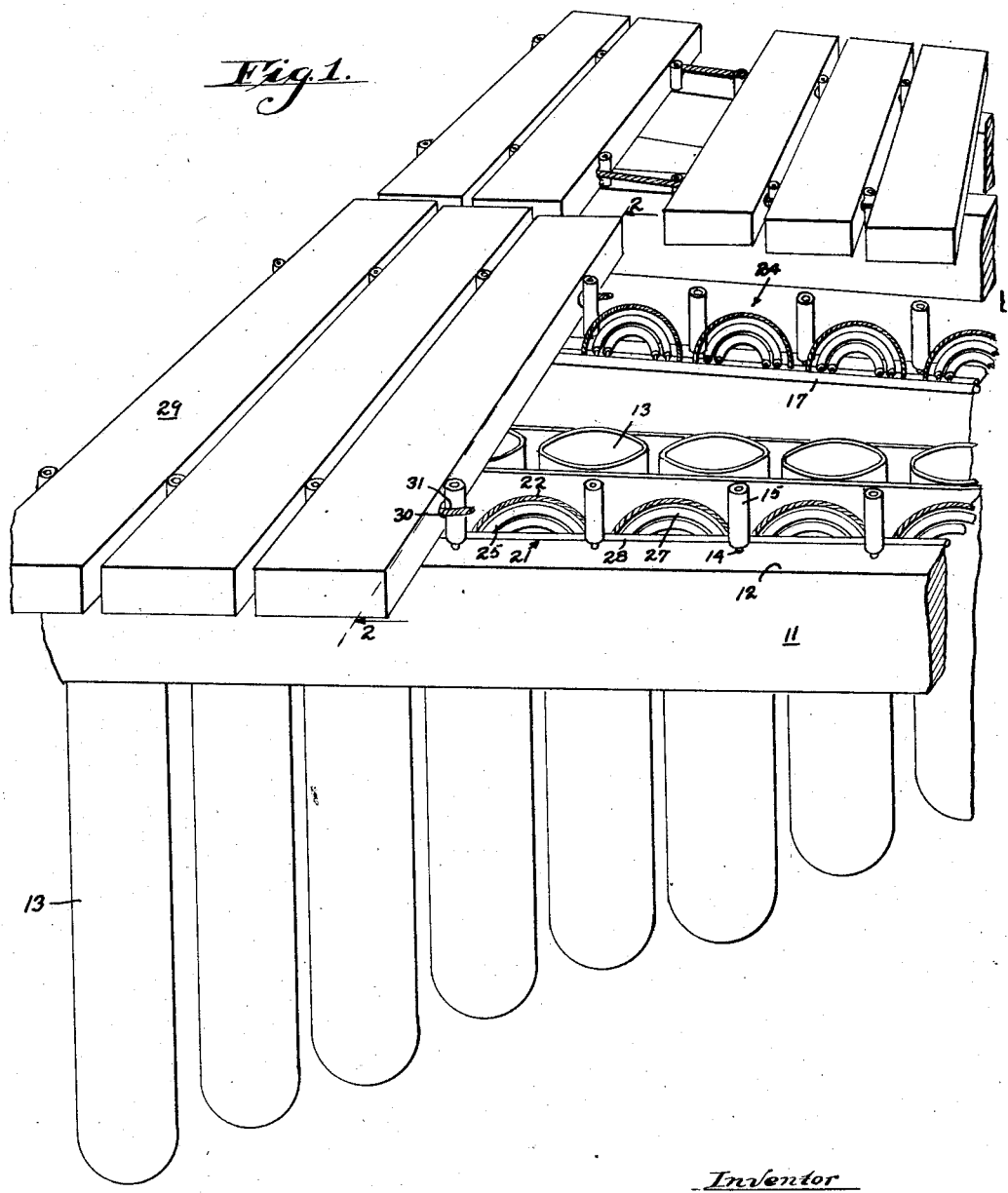

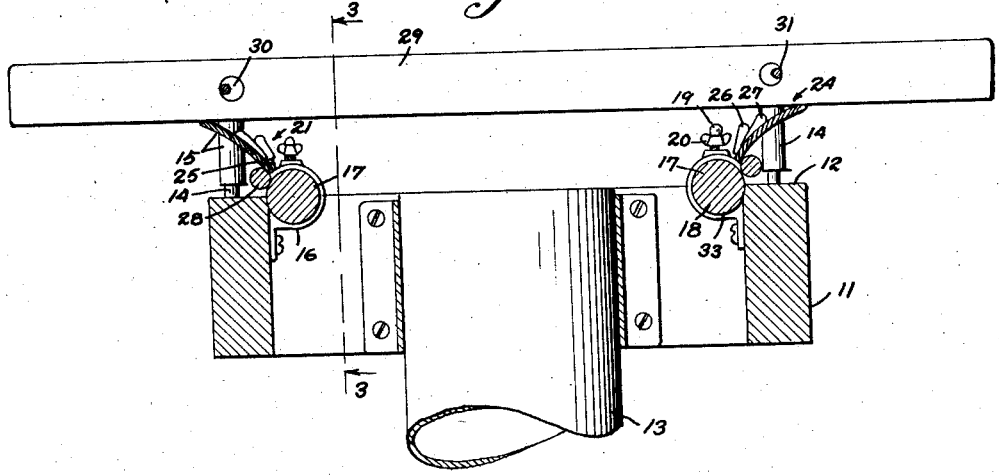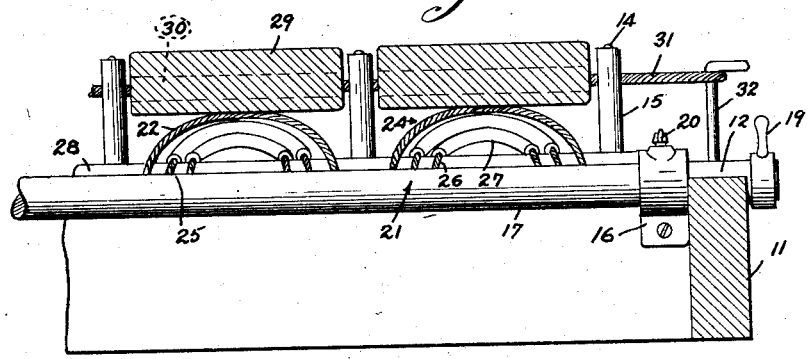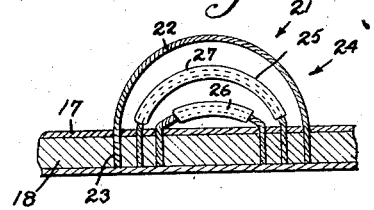

1,807,057

UNITED STATES PATENT OFFICE

HARRY A. BOWERS, OF HOLLYWOOD, CALIFORNIA

BAR MOUNTING FOR XYLOPHONES OR THE LIKE

Application filed February 12, 1930. Serial No. 427,794.

My invention pertains to an improvement in note bar mountings for xylophones or the like.

It has been the ordinary practice in xylophone construction or like instruments to have the bars or notes supported on felt strips and positioned between pegs, such pegs having rubber covering or the like, but even with the felt construction there is somewhat of a dampening action of the vibration of the bars or notes when struck. An object therefore of my invention is a resilient mounting for the bars or notes whereby the bars may have a freer vibration than when supported on felts or the like and a further object of my invention is a resilient support in which a succession of springs may be brought into action when the bar is struck violently and therefore prevent the bar from being brought into contact with a solid body and thus give a freer vibration to the bar.

In this connection I preferably have a mounting for the bars whereby several springs of different lengths are employed to support the opposite ends of the bar, the longest spring having sufficient strength to carry the weight of the bar, but when the bar is struck violently it may be forced down until it comes into contact with the succeeding center springs and thus the force of the blow is taken up by the springs.

Another feature and object of my invention is forming the spring mounting so that this may be varied as by moving the springs to change their relative height, whereby the bar may be lightly supported by the longest spring and the succeeding center springs brought into action with less depression of the bar.

A simple construction for the mounting is to use rods or tubes at each side of the xylophone frame and each bar to have a plurality of partly circular springs, these being formed preferably of wires coiled into tight helices and with the ends secured in the rod. In conjunction with the rod I preferably use a supporting rod against which the springs may lean outwardly. The bar or note is then supported on the upwardly curved part of the longest spring, the springs being made more or less concentric and if it is desired to change the elevation and resiliency of the springs, the supporting bar may be partly rotated.

My invention is illustrated in the accompanying drawings, in which,

Fig. 1 is a perspective view showing part of a xylophone with sections broken away, illustrating the mounting of the notes or bars;

Fig. 2 is a transverse section through the mounting parallel to one of the bars, as if taken on the line 2—2 of Fig. 1 in the direction of the arrows;

Fig. 3 is a detail vertical longitudinal section taken on the line 3—3 of Fig. 2 in the direction of the arrows;

Fig. 4 is a section taken longitudinally through the supporting rod or tube, illustrating the mounting of the springs.

In the construction illustrated the side rails of the xylophone are designated by the numeral 11, having a top surface 12. The bars are usually rectangular in shape and converge from one end of the instrument to the other to accommodate bars of different pitch. The resonance tubes 13 are suspended in the frame but these do not enter into my present invention. There are a series of pegs 14 secured in the top surface of the side rails 11. These pegs have a rubber covering 15 which is of the usual construction.

At each end of the rails 11 and on the inside I have supporting brackets 16 and in these supporting brackets are mounted rotatable rods or tubes 17. In the illustration I use tubing with a wood core 18. A handle 19 is secured on the end by which these rods may be rotated and such rods may be clamped by set screws 20 extending through the brackets 16.

A series of springs 21 are secured to the rod 17. These springs are illustrated as being of tightly helically coiled wire indicated at 22; the ends of which are inserted through openings in the lower rod 17 and have their lower ends 23 secured in the rod. In the illustrations I have an outer spring 24, an intermediate spring 25 and an inner spring 26. The intermediate and inner springs are covered with a rubber sleeve 27. These springs normally are all in the same plane and fitting closely against the sides of the springs there is a supporting rod 28 which rod is attached to the rod 17 and may be rotated therewith. It is obvious therefore that the springs may be positioned to be nearly vertical or may be inclined to one side. It is my practice to have the springs at the same relative position on both sides of the instrument.

The bars are designated by the numeral 29 and referring to Figs. 2 and 3, it will be seen that these are substantially supported by the longest or outermost spring 24, although this spring is flexed so that the bars are almost in contact with the covering on the intermediate spring 25. Therefore as soon as the bar is struck it is depressed and brings the intermediate spring into action and a heavier blow distorts both of the springs until the third spring supports part of the weight of the bar and the combination of springs prevents the bar from coming in contact with the side rails of the xylophone. Each of the bars is shown as provided with a perforation 30 adjacent each end through which is threaded cords 31, which cords are caught around the pins 14 and at the ends are attached to hooks 32. The cords function in the usual manner in these instruments and prevent too great a displacement of the bars.

In the illustration of Fig. 4 I have shown the springs extending through a wood filler 18 in the rotatable rods or tubes 17. This forms a tight clamping arrangement for the ends of the springs and the springs of different length may thus be arranged in alignment. Due to the arrangement for tilting the rotatable rods supporting the springs, the inclination of these springs to the note bars may be varied as clearly understood in Fig. 2. These springs flex by bending outwardly and thus bringing the successive springs into action.

I find a convenient manner of making the springs is to use piano wire tightly coiled in a helix, and although the various bars differ in weight from the bass to the treble, it is not necessary as a rule to use different sizes or different strength of springs. However, the springs if desired may be varied in accordance with the weight of the note. When the bar vibrates, the contact points of the springs on the bar are caused to shift slightly but as the intermediate and the innermost spring are covered by a rubber sleeve, there is no grating or scratching action and the outer spring has very little movement in relation to the vibrating bar.

It is obvious that if desired I may utilize other types of springs and in fact a construction with all of the springs engaging the note bars will be suitable by having the springs of different strength so that as the note bar becomes depressed to a greater extent, there is a stronger spring action urging it to its return position and allowing a free vibration of the note bar.

Various changes may be made in the principles of my invention without departing from the spirit thereof as set forth in the description, drawings and claims.

I claim:

1. A musical instrument having a plurality of note bars, a plurality of springs supporting each bar and additional springs positioned to engage and support the bar when depressed by a percussion stroke, the said springs permitting vibration of the said bars.

2. A musical instrument having a plurality of note bars, a pair of sets of springs to support each bar, each set having a spring to engage and support a bar adjacent its end and successive springs positioned to engage and partly support the bar when depressed by a percussion stroke or by vibration of the bar.

3. A musical instrument having a frame with a rail at each side, a plurality of note bars extending transversely above the rails, a pair of sets of springs to support each bar, the springs of each set being of successive varying height above the rails, whereby a bar may be supported by the longest spring and when struck a percussion stroke, the bar is partly supported by successively shorter springs.

4. A musical instrument having a pair of rails on opposite sides, a plurality of note bars extending transversely above the rails, a pair of sets of springs to support each bar, each set positively connected to a side rail, the said springs of each set extending to successively greater elevations above the rails, the uppermost springs being adapted to support a note bar when stationary and the shorter springs being adapted to engage and partly support a note bar when struck a percussion blow and cushioning on the shorter spring.

5. A musical instrument having a pair of side supporting structures, a plurality of note bars, a spring for each end of a note bar made in the form of a curve and having at its ends a fixed connection to the supporting structure, each note bar being adapted to rest on the curved part of the spring.

6. A musical instrument having a pair of longitudinally extending supporting structures, a plurality of note bars positioned above the said structures, a pair of sets of supporting springs for each bar, each set having a plurality of springs and each spring being formed in a curve shape having its ends secured to the supporting structure, the springs extending successively to different elevations above the supporting structures and retaining the bars elevated above the said structures, the said bars successively forming a contact with the springs on depression due to percussion strokes.

7. A musical instrument having a supporting structure on each side, a plurality of note bars positioned above the said structure, a pair of sets of springs to support each bar, each spring being curved and having its lower ends secured to the supporting structure, the springs of each set being in substantially the same plane when no weight is upon the springs and the springs being inclined outwardly in regard to each bar, the uppermost springs of each set being adapted to normally support a bar.

8. A musical instrument having a supporting structure on each side, a plurality of note bars positioned above the said structure, a pair of sets of springs to support each bar, the said springs of each set being somewhat in alignment and having their lower ends secured to the supporting structure and their upper ends positioned to support an end of the note bar, and means to tilt the said springs to vary the flexing thereof.

9. A musical instrument having a supporting structure on each side, each with a rotatable rod and having a series of note bars positioned above the rotatable rods, a pair of sets of springs to support each note bar, each set being secured to a rotatable rod, the said springs undergoing different flexures in accordance with the position of the rotatable rod.

10. A musical instrument as claimed in claim 9, the springs of each set being substantially in alignment and adapted to flex sideways under the pressure of the note bar.

11. A musical instrument having a pair of rotatable rods on each side, a plurality of note bars positioned above the rotatable rods, each of the rotatable rods having a pair of sets of springs to support each note bar, each set of springs comprising partial loops concentric one to the other and having the ends secured to the rotatable rod whereby the said springs may flex outwardly, the springs of each set being in substantial alignment.

12. A musical instrument having a pair of side supporting structures, a plurality of note bars, a spring to support each end of the note bar, such spring being made in the form of a curve having its lower ends secured to the supporting structure, the spring extending in the general longitudinal direction of the supporting structure and being transverse to note bars supported thereby, each bar resting on the upper curved portion of the springs.

13. A musical instrument having a pair of side supporting structures, a plurality of note bars, a spring supporting each end of the note bar, each spring being formed of a helically coiled wire and such wire being bent into a curve with its two ends secured to the supporting structure, the said springs extending longitudinally of the supporting structure and being transverse of the note bars, each note bar resting on the upper portion of two springs.

14. A musical instrument having a plurality of longitudinally extending rotatable rods, a plurality of note bars, a spring supporting each end of the note bar, each spring being formed in a curve and having its two ends secured to a rotatable rod, the curvature being in the longitudinal direction of the rod and transverse to the bar.

15. A musical instrument as claimed in claim 14, a supporting rod extending parallel to the rotatable rod and being positioned to engage the springs, said springs bending partly over the said supporting rod.

16. A musical instrument having a pair of longitudinally extending rotatable rods, a plurality of note bars, a spring supporting each end of a note bar, each spring being formed in a curve extending in a longitudinal direction and transverse to the note bars, each spring having two ends secured in the rotatable rod, such ends being spaced apart, a supporting rod parallel to each rotatable rod and engaging the springs.

17. A musical instrument as claimed in claim 16, there being an additional spring for each end of each bar, such spring being formed concentric to the spring supporting the bar and having its two ends secured to the rotatable rod.

In testimony whereof I have signed my name to this specification.

HARRY A. BOWERS.